(12) United States Patent
Hoglund et al.

(10) Patent No.: US 11,231,081 B2
(45) Date of Patent: Jan. 25, 2022

(54) HEAT SHIELD GROMMET

(71) Applicant: GOODRICH CORPORATION, Charlotte, NC (US)

(72) Inventors: Ty Austin Hoglund, Troy, OH (US); Paul J. Howard, Riverside, OH (US)

(73) Assignee: Goodrich Corporation, Charlotte, NC (US)

( * ) Notice: Subject to any disclaimer, the term of this patent is extended or adjusted under 35 U.S.C. 154(b) by 51 days.

(21) Appl. No.: 16/597,693

(22) Filed: Oct. 9, 2019

(65) Prior Publication Data

US 2021/0108691 A1   Apr. 15, 2021

(51) Int. Cl.
*F16D 65/78* (2006.01)
*B64C 25/34* (2006.01)
*B64C 25/42* (2006.01)

(52) U.S. Cl.
CPC .............. *F16D 65/78* (2013.01); *B64C 25/34* (2013.01); *B64C 25/42* (2013.01); *F16D 2065/785* (2013.01)

(58) Field of Classification Search
CPC ................. F16D 65/847; F16D 65/853; F16D 2065/1332; F16D 2065/1328; F16D 2065/783; F16D 2065/789; F16D 65/78; F16D 2069/004; F16D 65/827; F16D 2065/785; F16D 65/128; F16D 2055/0037; F16D 65/813; B64C 25/42; F16F 1/3732; F16F 1/373; F16F 1/3605; F16F 7/00; F16F 15/08; F16F 1/337; F16F 1/3735; F16F 1/3835; F16F 2234/02; F16F 15/04; F16F 7/015
See application file for complete search history.

(56) References Cited

U.S. PATENT DOCUMENTS

| 1,697,814 | A | * | 1/1929 | Forbes | F16F 1/3732 16/2.1 |
|---|---|---|---|---|---|
| 2,554,306 | A | * | 5/1951 | Mack | B62D 53/085 280/438.1 |
| 3,472,541 | A | * | 10/1969 | Hulten | F16C 11/04 403/146 |
| 3,498,040 | A | * | 3/1970 | William | D01H 7/48 57/115 |
| 4,358,098 | A | * | 11/1982 | Ceseri | F16F 1/3732 267/141.5 |

(Continued)

FOREIGN PATENT DOCUMENTS

| EP | 1548246 A2 | * | 6/2005 | ............ F02B 77/11 |
|---|---|---|---|---|
| WO | WO-2019039310 A1 | * | 2/2019 | ............ F16F 1/3732 |

OTHER PUBLICATIONS

European Patent Office, European Search Report dated Jun. 22, 2020 in Application No. 19213779.2.

*Primary Examiner* — Robert A. Siconolfi
*Assistant Examiner* — Mahbubur Rashid
(74) *Attorney, Agent, or Firm* — Snell & Wilmer L.L.P.

(57) ABSTRACT

A grommet for a heat shield may comprise a radially outward surface and a radially inward surface opposite the radially outward surface. A plug opening may be formed in the radially outward surface. An exterior radial surface may extend from the radially outward surface to the radially inward surface. A shield groove may be formed in the exterior radial surface. An inward protrusion may extend radially inward from the radially inward surface.

18 Claims, 7 Drawing Sheets

(56) References Cited

U.S. PATENT DOCUMENTS

| | | | | |
|---|---|---|---|---|
| 4,460,805 A * | 7/1984 | Johnson | | H01B 17/306 16/2.2 |
| 4,522,378 A * | 6/1985 | Nelson | | F16B 5/0258 16/2.1 |
| 4,702,386 A * | 10/1987 | Boehmer | | B60K 15/04 220/86.2 |
| 5,002,342 A * | 3/1991 | Dyko | | B60C 23/18 188/264 G |
| 5,052,699 A * | 10/1991 | Tucker | | H02G 3/088 277/606 |
| 5,199,536 A * | 4/1993 | Clark | | F16D 55/36 188/264 G |
| 5,236,249 A * | 8/1993 | Han | | B60C 23/18 301/6.1 |
| 5,526,549 A * | 6/1996 | Mori | | F16L 5/02 16/2.1 |
| 5,862,890 A | 1/1999 | Long et al. | | |
| 6,003,954 A | 12/1999 | Everhard et al. | | |
| 6,247,686 B1 * | 6/2001 | Gabbin | | F16F 1/3732 267/147 |
| 6,619,409 B2 * | 9/2003 | Iida | | B27B 17/0033 173/162.1 |
| 6,705,369 B1 * | 3/2004 | Russell | | B60C 29/02 152/427 |
| 7,281,303 B2 * | 10/2007 | Terrill | | B60S 1/0447 24/289 |
| 7,546,910 B2 | 6/2009 | Thorp et al. | | |
| 7,654,500 B1 * | 2/2010 | Jump | | A47G 1/1613 248/476 |
| 9,151,352 B2 * | 10/2015 | Mayr | | F16F 15/08 |
| 9,718,317 B2 * | 8/2017 | Kendricks | | B60B 25/004 |
| 9,908,375 B2 * | 3/2018 | Baden | | F16D 65/847 |
| 10,330,163 B2 | 6/2019 | French et al. | | |
| 2006/0219860 A1 * | 10/2006 | Greenwood | | B60R 13/0869 248/560 |
| 2009/0272872 A1 * | 11/2009 | Hoffman | | F16F 1/44 248/673 |
| 2009/0314518 A1 * | 12/2009 | Hasegawa | | F16J 3/042 174/153 G |
| 2010/0025172 A1 * | 2/2010 | Campbell | | F16D 65/12 188/264 AA |
| 2012/0241557 A1 * | 9/2012 | Coty | | F16D 55/40 244/100 R |
| 2014/0323182 A1 * | 10/2014 | Kim | | G06F 1/1647 455/566 |
| 2015/0308758 A1 | 10/2015 | Houser et al. | | |
| 2016/0025342 A1 * | 1/2016 | Erbas-Sen | | F23R 3/005 60/772 |
| 2016/0327271 A1 * | 11/2016 | Sandoval | | F23R 3/045 |
| 2017/0106973 A1 | 4/2017 | Baden et al. | | |
| 2018/0045250 A1 | 2/2018 | Doner et al. | | |

* cited by examiner

HEAT SHIELD GROMMET

FIELD

The present disclosure relates to wheel assemblies, and more specifically, to a heat shield grommet for an aircraft wheel assembly.

BACKGROUND

Aircraft wheel and brake assemblies typically include a heat shield located between the friction disks of the heat sink and the radially inward surface of the wheel. Heat shields, having a split ring structure, are generally not fastened directly to the wheel and may move radially and/or circumferentially. Movement of the heat shield can lead to wear on the heat shield and/or on components of the wheel (e.g., the fuse plug lug). Wear may also be caused by a reduction in the heat shield diameter during installation. For example, a heat shield, with a split ring structure, may be compressed to reduce the diameter of the heat shield and allow the heat shield to pass by radially inward wheel components (e.g., torque bar lugs), so the heat shield can be positioned radially inward of the wheel. Once in position, the heat shield should expand to its original diameter. If the heat shield does not expand to its intended diameter, it may contact the rotor lugs of the heat sink, which can lead to damage and corrosion of the heat shield and/or rotor lugs.

SUMMARY

The present disclosure provides a grommet for a heat shield. In accordance with various embodiments, the grommet may comprise a radially outward surface and a first radially inward surface opposite the radially outward surface. A plug opening may be formed in the radially outward surface. An exterior radial surface may extend from the radially outward surface to the first radially inward surface. A shield groove may be formed in the exterior radial surface. A first inward protrusion may extend radially inward from the first radially inward surface.

In various embodiments, a first slanted surface may extend from the radially outward surface to a first recessed surface of the grommet. The first recessed surface may be located radially inward of the radially outward surface. A second slanted surface may extend from the radially outward surface to a second recessed surface of the grommet. The second recessed surface may be located radially inward of the radially outward surface.

In various embodiments, a first interior radial surface may extend between the first recessed surface and the first radially inward surface. A second interior radial surface may extend between the second recessed surface and the first radially inward surface. A distance between the first slanted surface and the second slanted surface at the radially outward surface may be greater than a distance between the first interior radial surface and the second interior radial surface.

In various embodiments, a second inward protrusion may extend radially inward from the first radially inward surface. In accordance with various embodiments, a first internal surface may extend from a second radially inward surface of the first inward protrusion to the radially outward surface. A second internal surface may extend from a third radially inward surface of the second inward protrusion to the radially outward surface.

In various embodiments, a distance between the first internal surface and the second internal surface at the radially outward surface may be greater than a distance between the first internal surface and the second internal surface at the first radially inward surface. In various embodiments, the grommet may comprise silicon rubber.

A heat shield is also disclosed herein. In accordance with various embodiments, the heat shield may comprise a first shell and a grommet. An edge of the first shell may define, at least, a portion of a shield opening. The grommet may be located in the shield opening. The edge of the first shell may be located in a shield groove defined by the grommet.

In various embodiments, the grommet may comprise a radially outward surface, a first radially inward surface opposite the radially outward surface, a plug opening formed in the radially outward surface, an exterior radial surface extending from the radially outward surface to the first radially inward surface, and a first inward protrusion extending radially inward from the first radially inward surface. The exterior radial surface may define the shield groove.

In various embodiments, a second shell may be coupled to the first shell. The first shell and the second may define an internal volume of the heat shield.

In various embodiments, the grommet may further comprise a first slanted surface and a second slanted surface. The first slanted surface may extend from the radially outward surface to a first recessed surface of the grommet. The first recessed surface may be located radially inward of the radially outward surface. The second slanted surface may extend from the radially outward surface to a second recessed surface of the grommet. The second recessed surface may be located radially inward of the radially outward surface.

In various embodiments, the grommet may further comprise a first interior radial surface extending between the first recessed surface and the first radially inward surface, and a second interior radial surface extending between the second recessed surface and the first radially inward surface. A distance between the first slanted surface and the second slanted surface at the radially outward surface may be greater than a distance between the first interior radial surface and the second interior radial surface.

In various embodiments, the grommet may further comprise a second inward protrusion extending radially inward from the first radially inward surface. In various embodiments, the grommet may further comprise a first internal surface extending from a second radially inward surface of the first inward protrusion to the radially outward surface, and a second internal surface extending from a third radially inward surface of the second inward protrusion to the radially outward surface. A distance between the first internal surface and the second internal surface at the radially outward surface may be greater than a distance between the first internal surface and the second internal surface at the first radially inward surface.

A wheel assembly is also disclosed herein. In accordance with various embodiments, the wheel assembly may comprise a wheel, a torque bar coupled to the wheel, and a heat shield located radially between the torque bar and the wheel. The heat shield may comprise a grommet. The grommet may be located in a shield opening defined by an edge of the heat shield. The edge of the heat shield may be located in a shield groove defined by the grommet.

In various embodiments, the wheel may comprise a fuse plug lug extending radially inward from a radially inward surface of the wheel. The fuse plug lug may be located in a plug opening formed in a radially outward surface of the grommet.

In various embodiments, the grommet may comprise an exterior radial surface extending from the radially outward surface of the grommet to a radially inward surface of the grommet. The exterior radial surface may define the shield groove. A first inward protrusion may extend radially inward from the radially inward surface of the grommet. The first inward protrusion may be located in a groove defined by the torque bar.

In various embodiments, the grommet may further comprise a first recessed surface and a second recessed surface. The first recessed surface may be located radially between a radially inward surface of the fuse plug lug and a first sidewall of the torque bar. The second recessed surface may be located radially between the radially inward surface of the fuse plug lug and a second sidewall of the torque bar.

In various embodiments, the first recessed surface of the grommet may contact the radially inward surface of the fuse plug lug, and the radially inward surface of the grommet may contact the first sidewall of the torque bar.

In various embodiments, the grommet may further comprise a first slanted surface and a second slanted surface. The first slanted surface may extend from the radially outward surface of the grommet to the first recessed surface. The second slanted surface may extend from the radially outward surface of the grommet to the second recessed surface.

The foregoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Surface shading and cross hatching may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

A first component that is "radially outward" of a second component means that the first component is positioned a greater distance away from a common axis of the first and second components as compared to the second component. A first component that is "radially inward" of a second component means that the first component is positioned closer to a common axis of the first and second components than the second component.

Figure 1A:
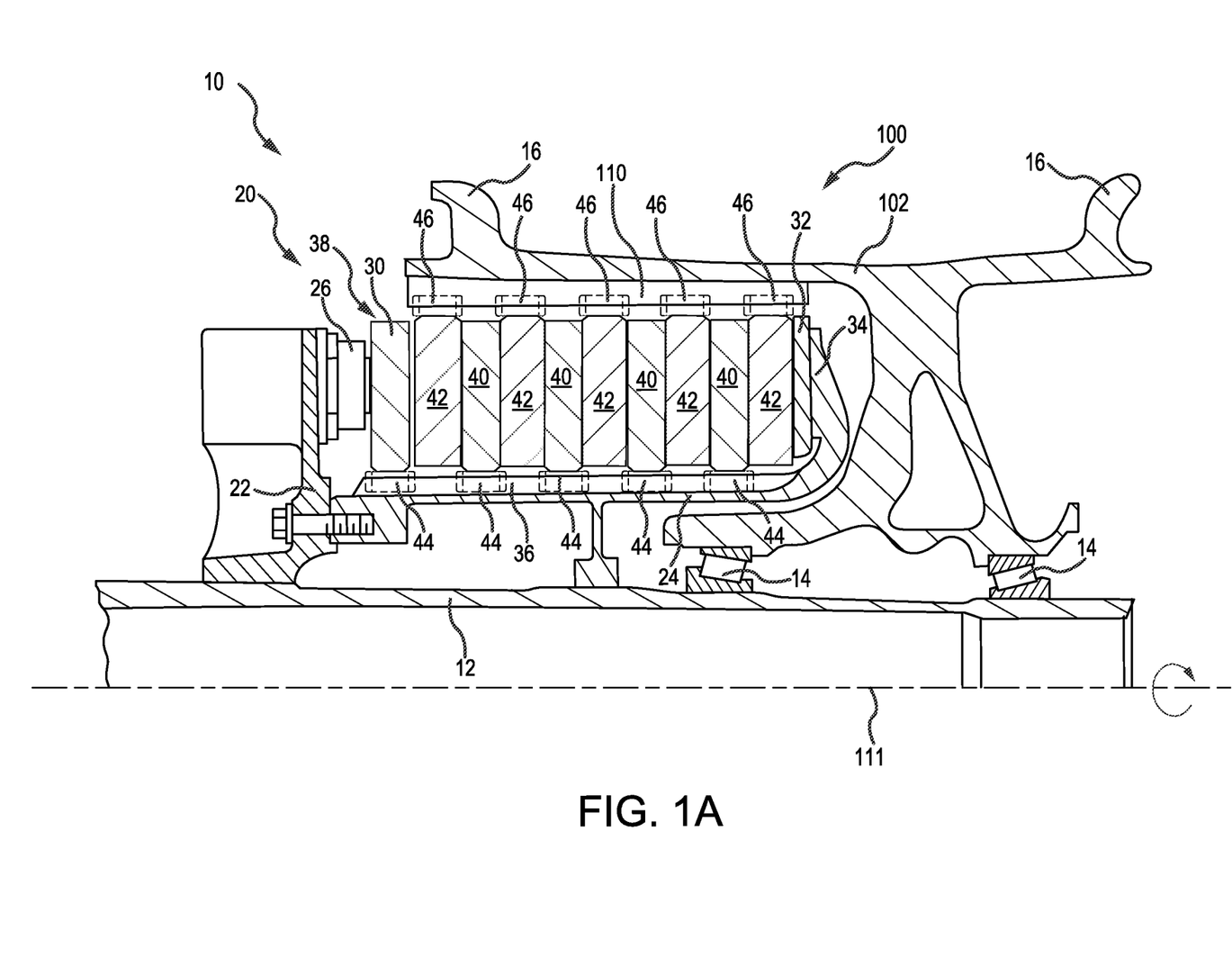
FIG. 1A illustrates a wheel and brake assembly, in accordance with various embodiments.

Referring to FIG. 1A, a wheel and brake assembly 10 is illustrated, in accordance with various embodiments. Wheel and brake assembly 10 may include a wheel assembly 100 and a brake assembly 20. Wheel assembly 100 includes a wheel 102, which may include rims 16 for supporting a tire. Wheel 102 may be supported for rotation around an axle 12 by bearings 14. Stated differently, wheel 102 may spin (i.e., rotate) about an axis of rotation 111. As used herein, the term "axial" refers to directions parallel to axis of rotation 111, the term "radial" refers to directions perpendicular to axis of rotation 111, and the term "circumferential" refers to directions about axis of rotation 111.

Wheel assembly 100 includes a series of axially extending rotor splines 110 (one shown), also referred to as "torque bars". Torque bars 110, in combination with brake assembly 20, may modulate rotation of wheel 102. Brake assembly 20 may include a piston housing 22, a torque tube 24, and a plurality of pistons 26 (one shown). Torque tube 24 may be an elongated annular structure that includes a reaction plate 34 and a series of axially extending stator splines 36 (one shown). Piston housing 22 may be mounted to axle 12. Torque tube 24 may be bolted, or otherwise attached, to piston housing 22 such that reaction plate 34 is located opposite pistons 26.

Brake assembly 20 further includes a plurality of friction disks 38. The plurality of friction disks 38 may include a pressure plate 30, an end plate 32, non-rotatable friction disks (stators) 40, and rotatable friction disks (rotors) 42. End plate 32 may be connected to reaction plate 34. In this regard, end plate 32 is non-rotatable by virtue of its connection to torque tube 24. Stators 40 and pressure plate 30 may include a plurality of stator lugs 44 at circumferentially spaced positions around an inner circumference of stators 40 and pressure plate 30. Rotors 42 may include a plurality of rotor lugs 46 at circumferentially spaced positions around an outer circumference of rotors 42.

Stators 40 may engage stator splines 36 by locating stator splines 36 in gaps formed between stator lugs 44. Thus, stators 40 and pressure plate 30 are generally non-rotatable by virtue of their engagement with stator splines 36 on torque tube 24. Similarly, rotors 42 engage torque bars 110 by locating torque bars 110 in gaps formed between rotor lugs 46. Thus, rotors 42 are rotatable by virtue of their engagement with torque bars 110 of wheel assembly 100.

In various embodiments, rotors 42 are arranged with end plate 32 on one end, pressure plate 30 on the other end, and stators 40 interleaved such that rotors 42 are adjacent to non-rotatable friction components. Pistons 26 are connected to piston housing 22 at circumferentially spaced positions around piston housing 22. Pistons 26 face axially toward friction disks 38 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

Figure 1B:
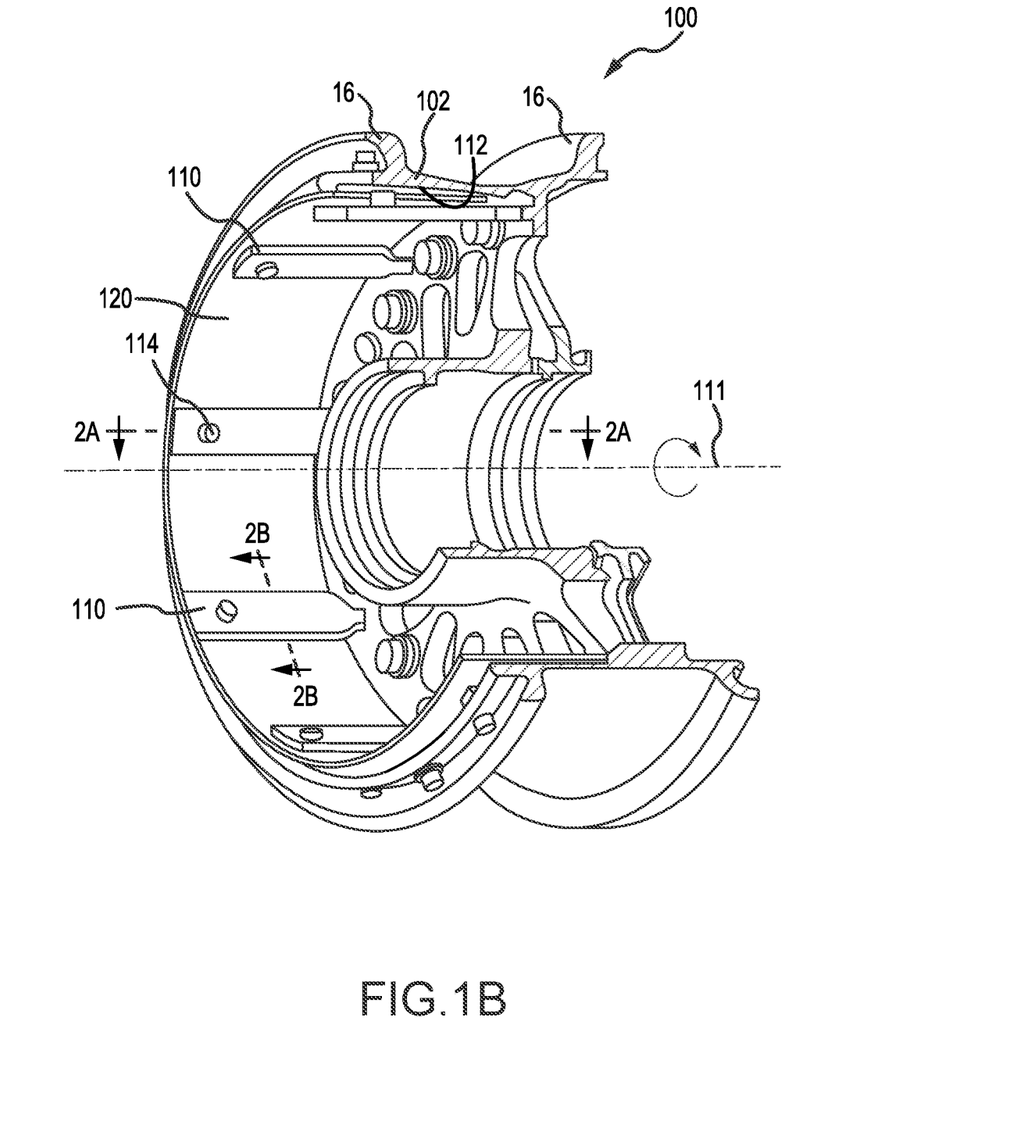
FIG. 1B illustrates a perspective view of a wheel assembly, in accordance with various embodiments.

With reference to FIG. 1B, additional details of wheel assembly 100 are illustrated. In accordance with various embodiments, wheel assembly 100 includes wheel 102 and torque bars 110. Torque bars 110 may be located circumferentially along a radially inward surface 112 of wheel 102.

Torque bars 110 may be coupled to wheel 102. For example, torque bars 110 may be coupled to wheel 102 via a fastener 114. Fastener 114 may comprise a bolt, screw, rivet, pin, clip, or any other suitable securement mechanism. Torque bars 110 may be oriented parallel to axis of rotation 111. Torque bars 110 are configured to engage brake assembly 20 in FIG. 1A. For example, torque bars 110 may engage rotor lugs 46 of friction disks 38.

Figure 2A:
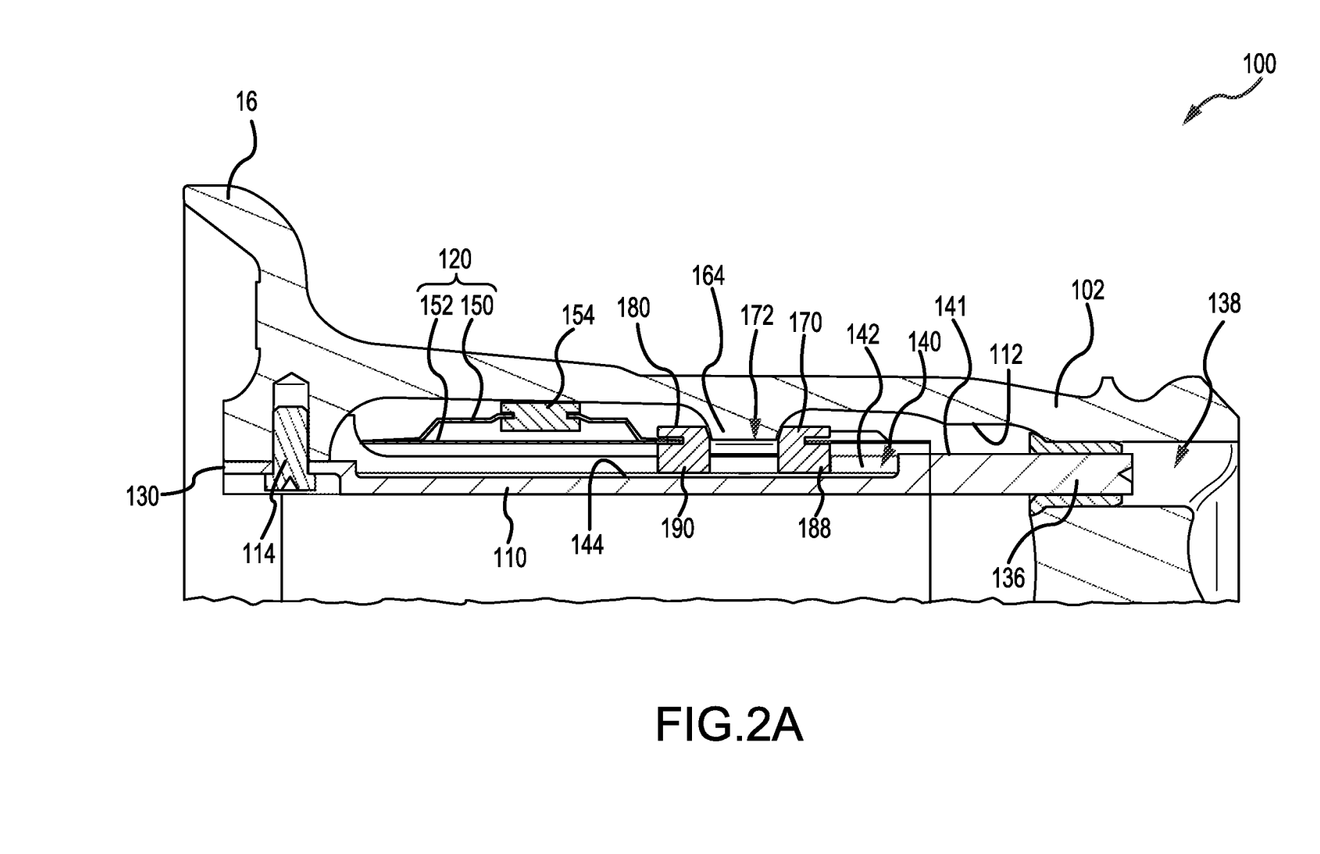
FIGS. 2A and 2B illustrate cross-section views of a wheel assembly taken along the line 2A-2A and the line 2B-2B, respectively, in FIG. 1B, in accordance with various embodiments.
Figure 3:
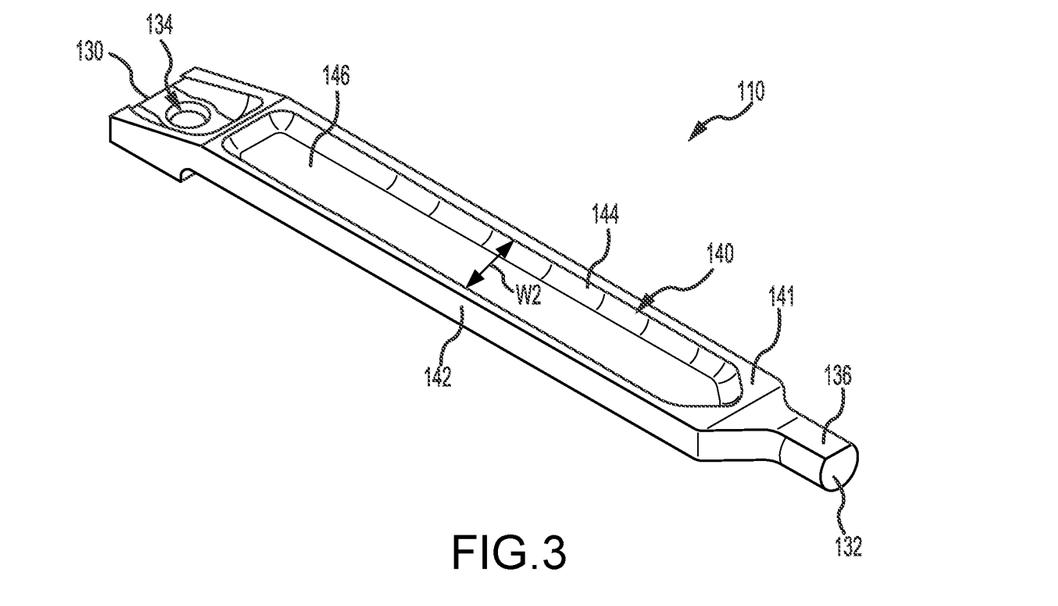
FIG. 3 illustrates a perspective view of a torque bar, in accordance with various embodiments.

With reference to FIG. 3, a torque bar 110 is illustrated, in accordance with various embodiments. Torque bar 110 includes a first end 130 and a second end 132. Torque bar 110 may define a fastener opening 134 proximate first end 130. A pin 136 of torque bar 110 is located at second end 132. Pin 136 may be configured to be received within a pin opening 138, with momentary reference to FIG. 2A, defined by wheel 102. A groove 140 may be formed in torque bar 110. Groove 140 may extend radially inward from a radially outward surface 141 of torque bar 110. Radially outward surface 141 may be oriented toward radially inward surface 112 of wheel 102, with momentary reference to FIG. 2A. In this regard, torque bar 110 may include sidewall 142 and sidewall 144. Sidewall 142 may be generally on an opposite side of groove 140 as compared to the sidewall 144. Sidewalls 142, 144 may extend radially from a floor 146 of torque bar 110. Floor 146 may be oriented toward radially inward surface 112 of wheel 102 (FIG. 2A). Floor 146 and sidewalls 142, 144 may, at least partially, define groove 140.

Returning to FIG. 1B, in accordance with various, wheel assembly 100 includes a heat shield 120. Heat shield 120 is located radially inward of wheel 102. Torque bars 110 may be located radially inward of heat shield 120. In this regard, heat shield 120 may be located between torque bars 110 and radially inward surface 112 of wheel 102 and/or between radially inward surface 112 of wheel 102 and friction disks 38 of brake assembly 20 in FIG. 1A. Heat shield 120 may protect wheel 102 from heat generated by the friction disks 38.

Figure 2B:
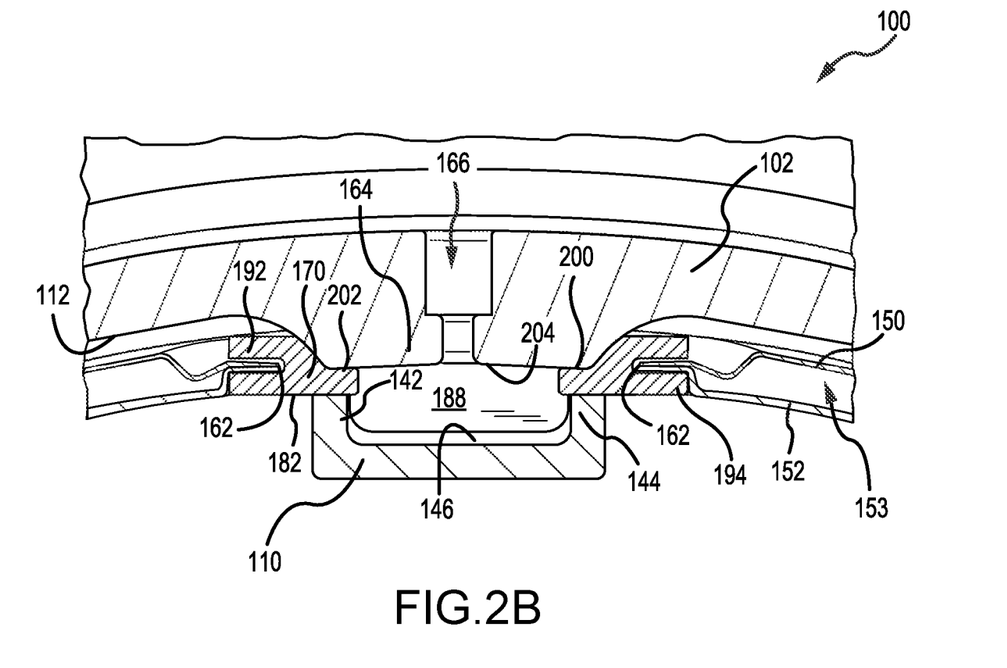
Figure 4A:
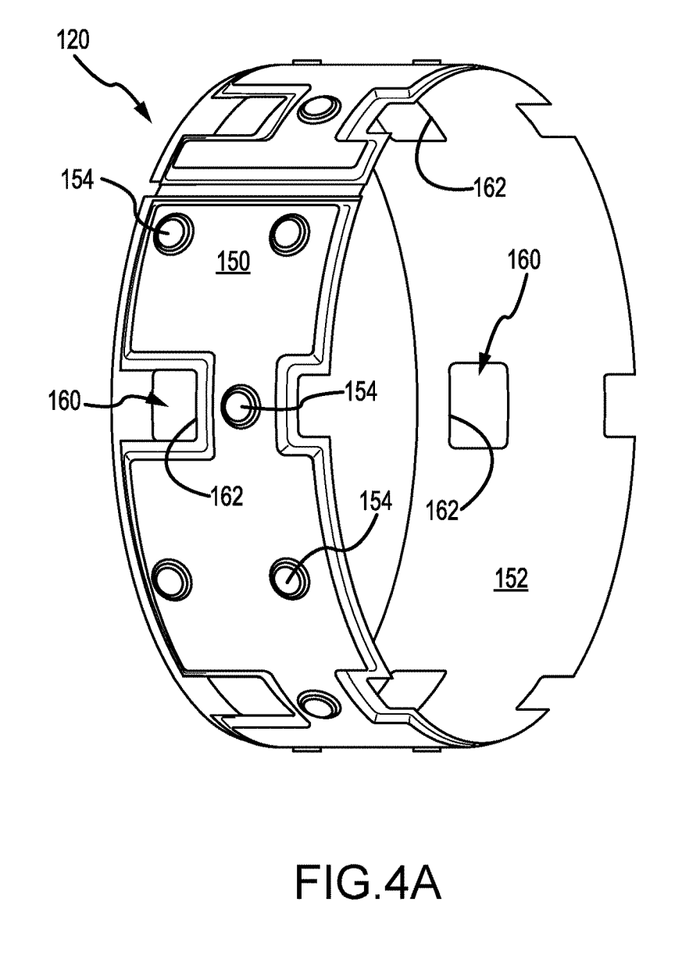
FIG. 4A illustrates a perspective view a heat shield, in accordance with various embodiments.

FIG. 2A illustrates a cross-section view of wheel assembly 100, taken along the line 2A-2A in FIG. 1B (i.e., axially through a torque bar 110). FIG. 2B illustrates a cross-section view of wheel assembly 100, taken along the line 2B-2B in FIG. 1B (i.e., circumferentially through a torque bar 110). FIG. 4A illustrates a perspective view of heat shield 120. With combined reference to FIG. 2A, FIG. 2B, and FIG. 4A, in various embodiments, heat shield 120 may include an outer (or first) shell 150 and an inner (or second) shell 152. Inner shell 152 may be located radially inward of outer shell 150. In various locations along heat shield 120, outer shell 150 may be spaced apart, in a radial direction, from inner shell 152. In this regard, outer shell 150 and inner shell 152 may define an internal volume 153 of heat shield 120. Internal volume 153 may be devoid of material or may include thermally insulating material. While heat shield 120 is illustrated as including two shells (outer shell 150 and inner shell 152), it is further contemplated and understood that in various embodiments, heat shield 120 may comprise a single shell.

In various embodiments, one or more spacers 154 may be coupled to heat shield 120. Spacers 154 may extend radially outward from the outer circumferential surface of heat shield 120. Spacers 154 may contact radially inward surface 112 of wheel 102. Spacers 154 may maintain a preselected radial distance between heat shield 120 and radially inward surface 112 of wheel 102. In this regard, spacers 154 may prevent, or reduce occurrences of, heat shield 120 physically contacting wheel 102.

In accordance with various embodiments, shield openings 160 are formed through heat shield 120. An edge 162 of heat shield 120 may define a perimeter of shield openings 160. Edge 162 may be formed by inner shell 152 and/or outer shell 150. In various embodiments, a portion of edge 162 may be formed by a combination of outer shell 150 and inner shell 152. For example, outer shell 150 and inner shell 152 may be attached to one another along edge 162. The locations of shield openings 160 tend to correspond to fuse plug lugs 164 on wheel 102. Fuse plug lugs 164 may comprise protrusions that extend radially inward from radially inward surface 112 of wheel 102. Fuse plug lugs 164 may define a fuse plug orifice 166. Fuse plug orifice 166 may receive a tire fuse plug configured to release air from the tire.

Figure 4B:
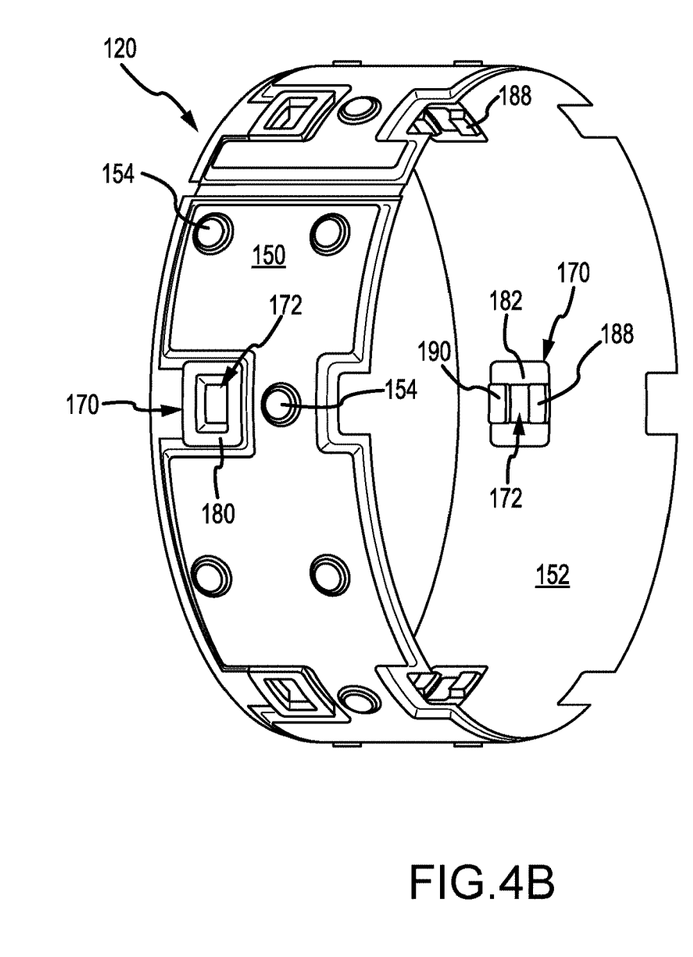
FIG. 4B illustrates a perspective view a heat shield with grommets located in the heat shield openings, in accordance with various embodiments.

In accordance with various embodiments, heat shield 120 of wheel assembly 100 may include one or more grommets 170. FIG. 4B shows grommet 170 coupled to heat shield 120. Grommets 170 may be located in shield openings 160 of heat shield 120. Grommets 170 may be formed from a thermally insulating material capable of withstanding temperatures of 500° F. (260° C.) and having a durometer hardness of 75±5, such as a thermoplastic elastomer. In various embodiments, grommet 170 may be formed from silicone rubber, polyoxymethylene, polypropylene, polyvinyl chloride, polyethylene, or any other thermally insulating material With reference to FIGS. 2A and 2B, grommets 170 are configured to receive fuse plug lug 164 of wheel 102. Grommets 170 may extend into groove 140 in torque bar 110. As described in further detail below, grommet 170 defines a shield groove 174 configured to receive edge 162 of heat shield 120.

Figure 5A:
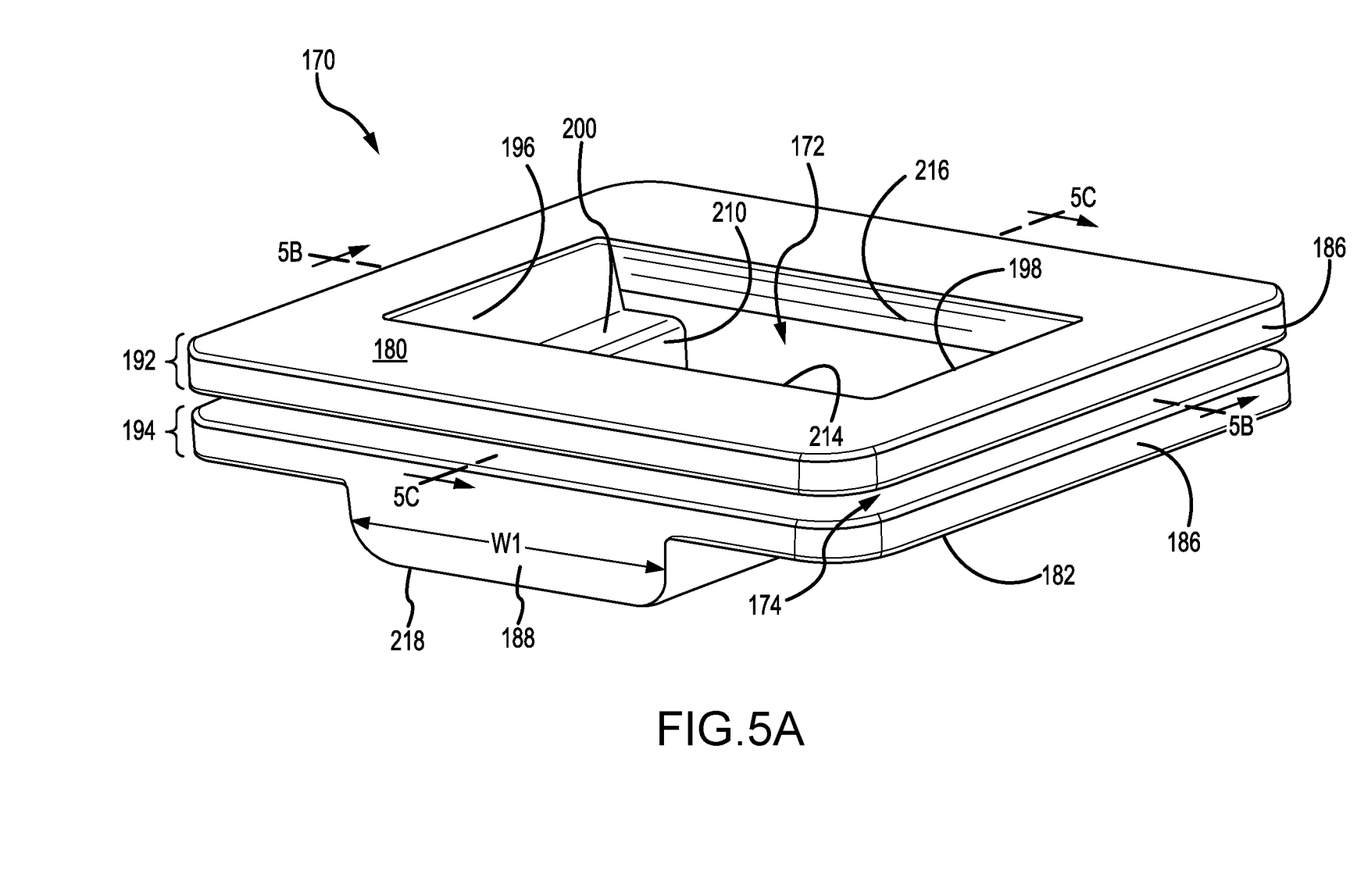
FIG. 5A illustrates a perspective view of a grommet for a heat shield, in accordance with various embodiments.

With reference to FIG. 5A, a perspective view of a grommet 170 is illustrated. In accordance with various embodiments, grommet 170 defines a plug opening 172. Plug opening 172 is configured to receive fuse plug lug 164 of wheel 102. Grommet 170 defines a shield groove 174. Shield groove 174 is configured to receive edge 162 of heat shield 120.

Grommet 170 includes a radially outward surface 180 and a (first) radially inward surface 182. Radially outward surface 180, which is generally opposite radially inward surface 182, is oriented away from axis of rotation 111. Plug opening 172 may be formed through radially outward surface 180 and radially inward surface 182. Shield groove 174 may be formed in an exterior radial surface 186 of grommet 170. Exterior radial surface 186 extends radially between radially outward surface 180 and radially inward surface 182.

Figure 5B:
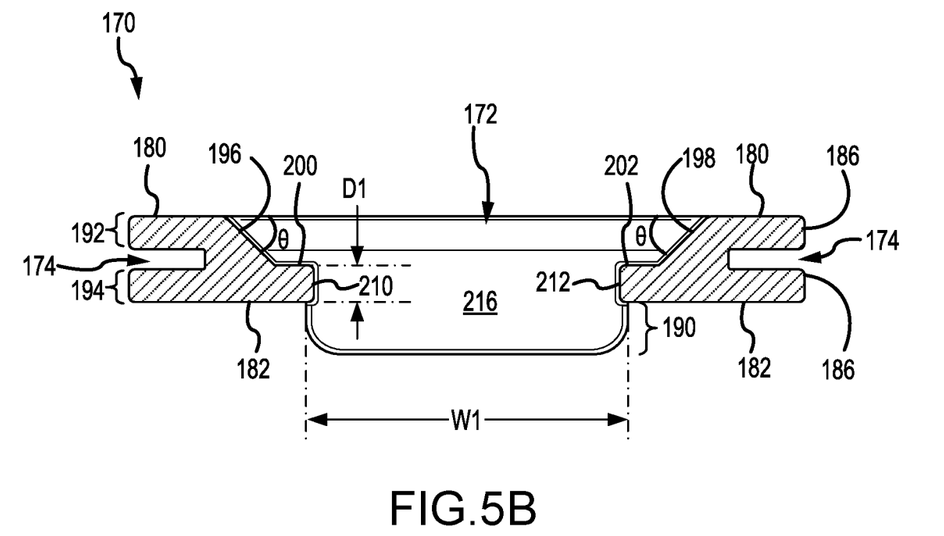
FIGS. 5B and 5C illustrate cross-section views of a grommet for a heat shield taken along the line 5B-5B and the line 5C-5C, respectively, in FIG. 5A, in accordance with various embodiments.
Figure 5C:
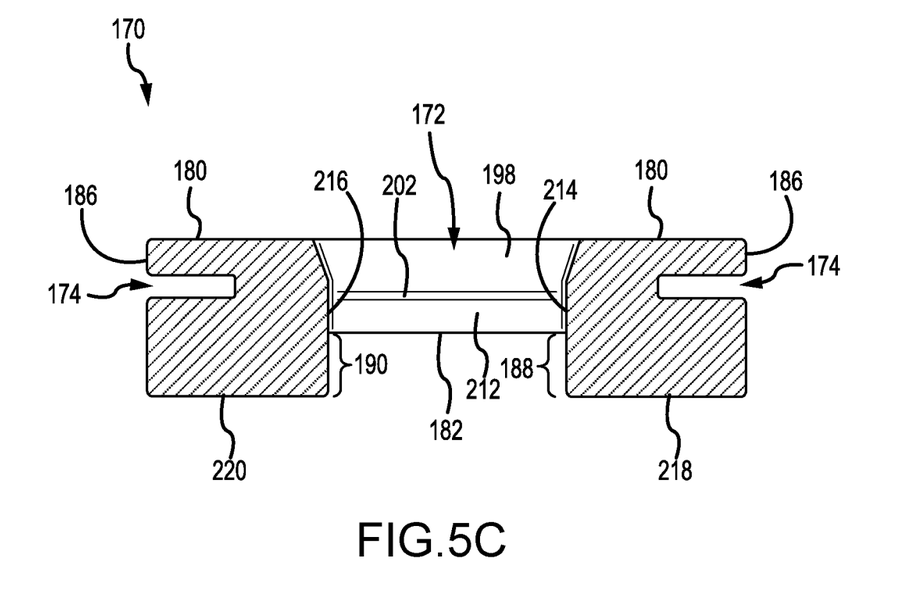

FIGS. 5B and 5C illustrate cross-section views of grommet 170 taken along the line 5B-5B and the line 5C-5C, respectively, in FIG. 5A. With combined reference to FIGS. 5A, 5B, and 5C, in various embodiments, grommet 170 further includes one or more inward protrusions, such as first inward protrusion 188 and second inward protrusion 190. First and second inward protrusions 188, 190 extend radially inward from radially inward surface 182 of grommet 170. First inward protrusion 188 may be on an opposite side of plug opening 172 as compared to second inward protrusion 190. First and second inward protrusions 188, 190 may each have a width W1. With combined reference to FIGS. 2B and 5B, width W1 of first and second inward protrusions 188, 190 may be selected to such that first and second inward protrusions 188, 190 may be located in groove 140 of torque bar 110. In this regard, the width W2 of groove 140, with momentary reference to FIG. 3, may be greater than width W1 of first and second inward protrusions 188, 190. Locating first and second inward protrusions 188, 190 within groove 140 tends to prevent, or restrict, circumferential movement of heat shield 120, thereby reducing wear on heat shield 120. Locating the first and second inward protrusions 188, 190 of circumferentially adjacent grommets 170 within various torque bars 110 along wheel 102 also tends to ensure, or increase a likelihood, that heat shield 120 is oriented at its desired diameter. Controlling the diameter of heat shield 120 tends to decrease occurrences of contact between heat shield 120 and rotor lugs 46 in FIG. 1A.

With combined reference to FIGS. 2A and 2B and FIGS. 5B and 5C, shield groove 174 is configured to receive edge 162 of heat shield 120. In this regard, an outer flange 192 of grommet 170 may be radially outward of edge 162 and an inner flange 194 of grommet 170 may be radially inward of edge 162 (i.e., edge 162 is located radially between inner flange 194 and outer flange 192). Outer flange 192 may be located between shield groove 174 and radially outward surface 180. Inner flange 194 may be located between shield groove 174 and radially inward surface 182.

With combined reference to FIG. 2B and FIG. 5B, plug opening 172 of grommet 170 may be configured to receive fuse plug lug 164 of wheel 102. Locating fuse plug lug 164 within plug opening 172 tends to prevent or reduce axial and circumferential movement of heat shield 120.

In various embodiments, grommet 170 may include a first slanted surface 196 and a second slanted surface 198. First slanted surface 196 may extend from radially outward surface 180 of grommet 170 to a first recessed surface 200 of grommet 170. Second slanted surface 198 may extend from radially outward surface 180 of grommet 170 to a second recessed surface 202 of grommet 170. An angle theta (θ) of first and second slanted surfaces 196, 198, relative to a plane parallel to radially outward surface 180, may be supplementary to the angle of fuse plug lug 164 relative to radially inward surface 112 of wheel 102. In various embodiments, angle theta (θ) may be between 90° and 20°. In various embodiments, angle theta (θ) may be between 60° and 30°. First and second recessed surfaces 200, 202 may be oriented in the radially outward direction. First and second recessed surfaces 200, 202 may be recessed radially with respect to radially outward surface 180. In this regard, first and second recessed surfaces 200, 202 are located radially inward of radially outward surface 180 and radially outward of radially inward surface 182. In various embodiments, a first interior radial surface 210 may extend between first recessed surface 200 and radially inward surface 182. A second interior radial surface 212 may extend between second recessed surface 202 and radially inward surface 182. In various embodiments, a distance between first slanted surface 196 and second slanted surface 198, as measured at the radially outward surface 180 may be greater than a distance between first interior radial surface 210 and second interior radial surface 212.

First and second slanted surfaces 196, 198, first and second recessed surfaces 200, 202, and first and second interior radial surfaces 210, 212 may each extend from a first internal surface 214 of grommet 170 to a second internal surface 216 of grommet 170. Stated differently, first and second internal surfaces 214, 216 may each extend between first and second slanted surfaces 196, 198; first and second recessed surfaces 200, 202; and first and second interior radial surfaces 210, 212. First internal surface 214 is oriented generally toward second internal surface 216. First internal surface 214 may extend between a (second) radially inward surface 218 of first inward protrusion 188 and radially outward surface 180. Second internal surface 216 may extend between a (third) radially inward surface 220 of second inward protrusion 190 and radially outward surface 180. First and second internal surfaces 214, 216 may extend in the radial direction and/or may be generally orthogonal to radially outward surface 180. As used in the previous context only, "generally" means±5°. In various embodiments, a radially outward portion of first and second internal surfaces 214, 216 may be slanted (i.e., oriented at a non-orthogonal angle relative to radially outward surface 180). In this regard, a distance between first internal surface 214 and second internal surface 216 as measured at radially outward surface 180 may be greater than the distance between first internal surface 214 and second internal surface 216 as measured at radially inward surface 182.

First and second recessed surfaces 200, 202 may contact a radially inward surface 204 of fuse plug lug 164 and/or radially inward surface 182 may contact radially outward surface 141 (FIG. 3) of torque bar 110. In this regard, first recessed surface 200 may be located between sidewall 144 of torque bar 110 and radially inward surface 204 of fuse plug lug 164, and second recessed surface 202 may be located between sidewall 142 to torque bar 110 and radially inward surface 204 of fuse plug lug 164. A distance D1 between radially inward surface 182 and first recessed surface 200 may be selected to be approximately equal to the distance between radially inward surface 204 of fuse plug lug 164 and radially outward surface 141 of sidewall 144 of torque bar 110. As used in the previous context only, "approximately" means±0.02 inches (0.51 mm). A distance between radially inward surface 182 and second recessed surface 202, which may be equal to distance D1, may be selected to be approximately equal to the distance between radially inward surface 204 of fuse plug lug 164 and radially outward surface 141 of sidewall 142 of torque bar 110. As used in the previous context only, "approximately" means±0.02 inches (0.51 mm). Locating a portion of grommet 170 between and/or in contact with radially inward surface 204 of fuse plug lug 164 and radially inward surface 141 of torque bar 110 tends to prevent, or restrict, radial movement of heat shield 120, which is located in shield groove 174. Restricting radial movement of heat shield 120 decreases a likelihood heat shield 120 will contact radially inward surface 112 of wheel 102 and/or rotor lugs 46 of friction disks 38.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A grommet for a heat shield, comprising
a radially outward surface;
a first radially inward surface opposite the radially outward surface;
a plug opening formed through the radially outward surface and the first radially inward surface;
an exterior radial surface extending radially from the radially outward surface to the first radially inward surface;
a shield groove formed in the exterior radial surface;
a first inward protrusion extending radially inward from the first radially inward surface and away from the radially outward surface, the first inward protrusion including a second radially inward surface oriented away from the radially outward surface, wherein a first distance between the radially outward surface and the first radially inward surface is less than a second distance between the radially outward surface and the second radially inward surface of the first inward protrusion;
a first recessed surface located radially inward of the radially outward surface and radially outward of the first radially inward surface, the first recessed surface being oriented in a radially outward direction;
a first interior radial surface extending radially from the first recessed surface to the first radially inward surface, wherein the first radially inward surface extends from the exterior radial surface to the first interior radial surface;
a second recessed surface located radially inward of the radially outward surface and radially outward of the first radially inward surface, the second recessed surface being oriented in the radially outward direction; and
a second interior radial surface oriented toward the first interior radial surface and extending radially from the second recessed surface to the first radially inward surface, wherein the first radially inward surface extends from the exterior radial surface to the second interior radial surface.

2. The grommet of claim 1, further including:
a first slanted surface extending from the radially outward surface to the first recessed surface of the grommet; and
a second slanted surface extending from the radially outward surface to the second recessed surface of the grommet.

3. The grommet of claim 2, wherein a third distance between the first slanted surface and the second slanted surface at the radially outward surface is greater than a fourth distance between the first interior radial surface and the second interior radial surface.

4. The grommet of claim 3, further comprising a second inward protrusion extending radially inward from the first radially inward surface.

5. The grommet of claim 4, further comprising:
a first internal surface extending from the second radially inward surface of the first inward protrusion to the radially outward surface; and a second internal surface extending from a third radially inward surface of the second inward protrusion to the radially outward surface, wherein each of the first recessed surface, the first interior radial surface, the second recessed surface, and the second interior radial surface extends between the first internal surface and the second internal surface.

6. The grommet of claim 5, wherein a fifth distance between the first internal surface and the second internal surface at the radially outward surface is greater than a sixth distance between the first internal surface and the second internal surface at the first radially inward surface.

7. The grommet of claim 6, wherein the grommet comprises silicon rubber.

8. A heat shield, comprising:
a first shell, wherein an edge of the first shell defines, at least, a portion of a shield opening; and
a grommet located in the shield opening, wherein the edge of the first shell is located in a shield groove defined, at least partially, by an outer flange and an inner flange of the grommet, wherein the first shell is located radially between the outer flange and the inner flange such that the outer flange overlaps the first shell in a radially outward direction and the inner flange overlaps the first shell in a radially inward direction, wherein the grommet further comprises:
a radially outward surface;
a first radially inward surface opposite the radially outward surface;
a plug opening formed through the radially outward surface and the first radially inward surface;
an exterior radial surface extending radially from the radially outward surface to the first radially inward surface, wherein the shield groove is formed in the exterior radial surface;
a first inward protrusion extending radially inward from the first radially inward surface and away from the radially outward surface, the first inward protrusion including a second radially inward surface oriented away from the radially outward surface, wherein a first distance between the radially outward surface and the first radially inward surface is less than a second distance between the radially outward surface and the second radially inward surface of the first inward protrusion;
a first recessed surface located radially inward of the radially outward surface and oriented in the radially outward direction;
a first interior radial surface extending radially from the first recessed surface to the first radially inward surface, wherein the first radially inward surface extends from the exterior radial surface to the first interior radial surface;
a second recessed surface located radially inward of the radially outward surface and oriented in the radially outward direction; and
a second interior radial surface oriented toward the first interior radial surface and extending radially from the second recessed surface to the first radially inward surface, wherein the first radially inward surface extends from the exterior radial surface to the second interior radial surface.

9. The heat shield of claim 8, further comprising a second shell coupled to the first shell, wherein the first shell and the second shell define an internal volume of the heat shield.

10. The heat shield of claim 8, wherein the grommet further comprises:

a first slanted surface extending from the radially outward surface to the first recessed surface of the grommet; and
a second slanted surface extending from the radially outward surface to the second recessed surface of the grommet.

11. The heat shield of claim 10, wherein a third distance between the first slanted surface and the second slanted surface at the radially outward surface is greater than a fourth distance between the first interior radial surface and the second interior radial surface.

12. The heat shield of claim 11, wherein the grommet further comprises a second inward protrusion extending radially inward from the first radially inward surface.

13. The heat shield of claim 12, wherein the grommet further comprises:
a first internal surface extending from the radially outward surface to the second radially inward surface of the first inward protrusion; and
a second internal surface extending from the radially outward surface to a third radially inward surface of the second inward protrusion, and wherein a fifth distance between the first internal surface and the second internal surface at the radially outward surface is greater than a sixth distance between the first internal surface and the second internal surface at the first radially inward surface.

14. A wheel assembly, comprising:
a wheel;
a torque bar coupled to the wheel, the torque bar include a first sidewall and a second sidewall; and
a heat shield located radially between the torque bar and the wheel, the heat shield comprising a grommet, wherein the grommet is located in a shield opening defined by an edge of the heat shield, and wherein the grommet includes:
a radially outward surface oriented away from the torque bar;
a radially inward surface opposite the radially outward surface;
an exterior radial surface extending from the radially outward surface to the radially inward surface of the grommet, the exterior radial surface defining a shield groove, the edge of the heat shield being located in the shield groove; and
a first inward protrusion extending radially inward from the radially inward surface of the grommet, wherein the first inward protrusion is located in a groove defined, at least partially, by the first sidewall and the second sidewall of the torque bar.

15. The wheel assembly of claim 14, wherein the wheel comprises a fuse plug lug extending radially inward from a radially inward surface of the wheel, and wherein the fuse plug lug is located in a plug opening formed in the radially outward surface of the grommet.

16. The wheel assembly of claim 15, wherein the grommet further comprises:
a first recessed surface located radially between a radially inward surface of the fuse plug lug and the first sidewall of the torque bar; and
a second recessed surface located radially between the radially inward surface of the fuse plug lug and the second sidewall of the torque bar.

17. The wheel assembly of claim 16, wherein the first recessed surface of the grommet contacts the radially inward surface of the fuse plug lug, and wherein the radially inward surface of the grommet contacts the first sidewall of the torque bar.

18. The wheel assembly of claim 17, wherein the grommet further comprises:
  a first slanted surface extending from the radially outward surface of the grommet to the first recessed surface of the grommet; and
  a second slanted surface extending from the radially outward surface of the grommet to the second recessed surface of the grommet.

* * * * *